United States Patent
Funabashi et al.

(10) Patent No.: US 8,183,836 B2
(45) Date of Patent: May 22, 2012

(54) LITHIUM BATTERY PACK

(75) Inventors: Kazuhiko Funabashi, Ibaraki (JP);
Nobuhiro Takano, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 12/716,953

(22) Filed: Mar. 3, 2010

(65) Prior Publication Data
US 2010/0159309 A1 Jun. 24, 2010

Related U.S. Application Data (63) Continuation of application No. 11/710,482, filed on Feb. 26, 2007, now Pat. No. 7,723,960.

(30) Foreign Application Priority Data

Mar. 31, 2006 (JP) .............................. P2006-097090

(51) Int. Cl.
*H02J 7/00* (2006.01)
*G01N 27/416* (2006.01)
*G08B 21/00* (2006.01)

(52) U.S. Cl. ........ 320/134; 320/136; 320/149; 320/155; 324/426; 340/636.1; 340/636.21

(58) Field of Classification Search .................... 320/134
See application file for complete search history.

(56) References Cited

U.S. PATENT DOCUMENTS
5,914,586 A 6/1999 Fujita et al.
(Continued)

FOREIGN PATENT DOCUMENTS
JP 63-69415 3/1988
(Continued)

OTHER PUBLICATIONS

Japanese Office Action, and English translation thereof, issued in Japanese Patent Application No. 2006-097090 dated Jan. 5, 2012.

*Primary Examiner* — Edward Tso
*Assistant Examiner* — Yalkew Fantu
(74) *Attorney, Agent, or Firm* — McDermott Will & Emery LLP (57) ABSTRACT

In a battery pack which comprises: a battery set composed of two or more lithium battery cells connected in series; a first protection circuit including a first voltage detect part for detecting the voltage(s) of a part of the two or more battery cells, and a first signal output part for issuing an output signal when a detect voltage detected by the first voltage detect part goes below a given over-discharge judgment voltage value; a second protection circuit including a second voltage detect part for detecting the voltage(s) of another part of the two or more battery cells, and a second signal out part for issuing an output signal when the detect voltage of the battery cell detected by the second voltage detect part goes below a given over-discharge judgment voltage value; and, a switch which is connected to the current path of the battery set and can be turned on or off according to the output signals of the first and second signal output parts and, there is further provided dead time means connected between the second signal output part of the second protection circuit for issuing an output not responding to a variation in an input signal occurring within a given time.

24 Claims, 4 Drawing Sheets

U.S. PATENT DOCUMENTS

| | | | |
|---|---|---|---|
| 6,075,343 A * | 6/2000 | Hsu | 320/134 |
| 6,208,117 B1 * | 3/2001 | Hibi | 320/134 |
| 6,396,246 B2 * | 5/2002 | Haraguchi et al. | 320/134 |
| 6,992,463 B2 * | 1/2006 | Yoshio | 320/134 |
| 2004/0101744 A1 | 5/2004 | Suzuki | |
| 2004/0178768 A1 * | 9/2004 | Miyazaki et al. | 320/116 |

FOREIGN PATENT DOCUMENTS

JP   2002-223063   8/2002

* cited by examiner

| | OUTPUT OF OVER-DISCHARGE SIGNAL OUTPUT PART 325 | OUTPUT OF OVERCHARGE SIGNAL OUTPUT PART 326 | OUTPUT OF OVER-DISCHARGE SIGNAL OUTPUT PART 335 | OUTPUT OF OVERCHARGE SIGNAL OUTPUT PART 336 |
|---|---|---|---|---|
| NORMAL | L | L | L | L |
| OVERCHARGE | L | H | L | H |
| OVER-DISCHARGE | H | L | H | L |

FIG. 5

| | OPERATION OF FET 51 | OPERATION OF FET 53 | OPERATION OF FET 52 | OPERATION OF FET 54 | OPERATION OF FET 31A | OPERATION OF FET 31B |
|---|---|---|---|---|---|---|
| NORMAL | ON | ON | OFF | OFF | ON | ON |
| OVERCHARGE | ON | OFF | OFF | ON | ON | OFF |
| OVER-DISCHARGE | OFF | ON | ON | OFF | OFF | ON |

LITHIUM BATTERY PACK

RELATED APPLICATIONS

This application is a Continuation of U.S. application Ser. No. 11/710,482, filed on Feb. 26, 2007, now U.S. Pat. No. 7,723,960, claiming priority of Japanese Patent Application No. 2006-097090, filed on Mar. 31, 2006, the entire contents of each of which are hereby incorporated by reference.

BACKGROUND

1. Technical Field

The present invention relates to a lithium battery pack for use in a cordless power tool or the like.

2. Description of Related Art

Generally, a lithium battery includes a vanadium lithium battery, a manganese lithium battery and similar batteries, each of which uses a lithium aluminum alloy in the negative pole thereof and also uses organic electrolyte as electrolyte. Also, a lithium ion battery generally means a battery which uses cobalt oxide lithium in the positive pole thereof and graphite in the negative pole thereof and also uses organic electrolyte as electrolyte. In the present specification, for convenience sake, the organic electrolyte secondary battery, which includes the lithium battery and lithium ion battery, is generically called a lithium battery simply.

As the power supply of the cordless power tool, conventionally, there are often used a nickel-cadmium (N—Cd) battery, a nickel hydrogen (Ni-MH) battery and the like. However, recently, with the increasing need for the enhanced capacity and reduced weight of the power supply, there has been used the lithium battery.

The nominal voltage of an ordinary nickel-cadmium battery is 1.2 V, whereas the nominal voltage of a lithium battery is large, for example, 3.6 V, which means that the lithium battery has an advantage. On the other hand, the lithium battery is disadvantageous in that, when the lithium battery is overcharged or over-discharged, the lithium battery is greatly deteriorated. For example, when a lithium battery having a nominal voltage of 3.6 V is overcharged to or more than 4.5 V, the electrolyte thereof is decomposed, which causes the performance of the battery to deteriorate greatly. Also, when the lithium battery is over discharged to or less than 2.0 V, the performance of the battery is deteriorated greatly.

In view of the above problems, conventionally, there is provided a protection circuit which is used to monitor the overcharge or over-discharge of the respective battery cells contained within the battery pack; and, when the battery voltage of the respective battery cells becomes equal to or more than a first given value, and also when it becomes equal to or less than a second given value, the charge and discharge of the battery are stopped to thereby prevent the overcharge and over discharge of the battery.

SUMMARY

Since the above-mentioned protection circuit on the market is a general-purpose product (for example, MM1414 or MM3090 manufactured by Mitsumi Electric Co., Ltd), there is a limit on the number of battery cells the voltages of which can be detected. As regards the protection circuits available on the current market, the number of battery cells that can be detected is limited to four.

However, when the rated voltage of a power tool is high, it is necessary to use a battery pack which stores four or more battery cells therein. For example, a battery pack for use in a power tool having a rated voltage of 18 V has a structure in which five lithium batteries each having a voltage of 3.6 V are connected in series. Therefore, in this case, normally, a protection circuit for four battery cells and a protection circuit for a battery cell are used to prevent the overcharge or over-discharge of the lithium battery.

However, because these circuits are general-purpose products, in some cases, there is a possibility that the over discharge judgment voltage (the voltage used to recognize the battery cell as over-discharge) of the four-cell protection circuit is different from the over-discharge judgment voltage of the one-cell protection circuit. For example, there can occur a case in which the over-discharge judgment voltage of the four-cell protection circuit is 2.0 V, whereas the over-discharge judgment voltage of the one-cell protection circuit is 2.4 V. In this manner, when the over-discharge judgment voltage of the one-cell protection circuit is higher than the over-discharge judgment voltage of the four-cell protection circuit, protection against the over-discharge of the battery is substantially controlled by the one-cell protection circuit.

On the other hand, as a power tool using a battery pack, there exists a power tool in which, when the leading end of the power tool bites into a work, a large current flows instantaneously in a motor. That is, the load current Ia of a dc motor used in a power tool is expressed by the following expression: that is, Ia=(E−V)/Ra, where Ra expresses the armature winding resistance of the motor, E expresses the output voltage of the battery pack, and V expresses the back electromotive force of the motor. When the tool bites into the work, the rotation of the motor is stopped instantaneously to thereby bring the back electromotive force V to 0, with the result that the load current Ia becomes quite large instantaneously.

When such large load current Ia flows instantaneously in the respective lithium batteries contained in the battery pack, the battery voltage goes below the over-discharge judgment voltage of the one-cell protection circuit to thereby cut off the discharge circuit of the battery pack. In other words, there arises the following inconvenience: that is, although the battery pack is still in a state where it can take out energy equivalent to the capacity of the battery safely, owing to the actuation of the one-cell protection circuit, the battery pack is unable to take out a desired amount of battery energy.

Such inconvenience occurs because, when the number of cells of the battery pack is large, two or more protection circuits must be used and there are also used protection circuits which are different from each other in the characteristic specifications. In view of this, it can also be expected that a new protection circuit adapted to the number of cells of the battery pack is developed. However, this raises another problem that the resultant battery pack is expensive.

Thus, the invention is made to provide a battery pack which can solve the above-mentioned conventional problems. Specifically, it is an object of the invention to provide a battery pack which includes protection circuits in order to secure safety with respect to the overcharge and over-discharge of a lithium battery, wherein, even when the protection circuits vary from each other in the characteristic specifications thereof or in the characteristics thereof, a desired amount of battery energy can be taken out safely and at a low cost.

In attaining the above object, according to the invention, there is provided a lithium battery pack, comprising: a battery set composed of two or more lithium battery cells connected in series; a first protection circuit including a first voltage detect part for detecting the voltage (s) of a part of the two or more battery cells, and a first signal output part for issuing an output signal when a detect voltage detected by the first voltage detect part goes below a given over-discharge judgment voltage value; a second protection circuit including a second voltage detect part for detecting the voltage (s) of another part of the two or more battery cells, and a second signal output part for issuing an output signal when the detect voltage of the battery cell detected by the second voltage detect part goes below a given over-discharge judgment voltage value; characterized by dead time means connected between the second signal output part of the second protection circuit for issuing an output not responding to a variation in an input signal occurring within a given time.

According to a second aspect of the invention, there is provided a lithium battery pack having a structure suitable for use in a case where the over-discharge judgment voltage of the first protection circuit is smaller than the over-discharge judgment voltage of the second protection circuit.

According to a third aspect of the invention, the dead time means is composed of a time constant circuit made of a resistor and a capacitor; and a diode connected between the two terminals of the resistor.

According to a fourth aspect of the invention, there is further interposed a voltage level converter circuit between the dead time means and the switch means; and, the voltage level converter circuit is composed of a switching element which can be turned on when the signals of the first and second signal output parts are low level signals and can be turned off when the signals are high level signals, and a switching element which can be turned off when the signals are low level signals and to be turned on when the signals are high level signals.

According to a fifth aspect of the invention, the first and second protection circuits respectively include third and fourth signal output parts for issuing output signals when the detect voltage of the battery cell goes beyond a given overcharge judgment voltage value, and switch means which can be turned on or off according to the output signals of the third and fourth signal output parts.

According to a sixth aspect of the invention, there is provided a power tool, comprising: a battery set including two or more lithium battery cells connected in series; a first protection circuit for detecting the cell voltage (s) of a part of the two or more lithium battery cells and, when the thus detected voltage goes below a given over-discharge judgment voltage value, for issuing an output signal; a second protection circuit for detecting the cell voltage(s) of another part of the two or more lithium battery cells and, when the thus detected voltage goes below a given over-discharge judgment voltage value, for issuing an output signal; switch means connected to the current path of the battery set such that it can be turned on or off according to the outputs of the first and second protection circuit; dead time means connected between the second protection circuit and the switch means for issuing an output not responding to a variation in an input signal within a given time; and, a motor to which a voltage from the battery set can be supplied through the switch means.

The still another aspect of the invention can be understood more clearly from the following description.

According to the invention, there can be obtained the following effects.

That is:

(1) When a large load current Ia flows instantaneously in the respective lithium batteries of the battery pack, such current flow is not recognized as over-discharge, thereby eliminating the possibility that the discharge circuit of the battery pack can be cut off. Therefore, energy equivalent to the battery capacity of the battery pack can be taken out effectively.

(2) Even when the number of cells in the battery pack is large and thus two or more protection circuits must be used, since the general-purpose protection circuit can be used, there is no need to develop a new protection circuit for matching the number of cells in the battery pack, thereby being able to provide an inexpensive battery pack.

(3) It is possible to provide a battery pack which, even when the protection circuits differ from each other in the characteristic specifications thereof or vary from each other in the characteristics thereof, a desired amount of battery energy can be taken out safely and at a low cost.

DESCRIPTION OF THE EMBODIMENTS

Figure 1:
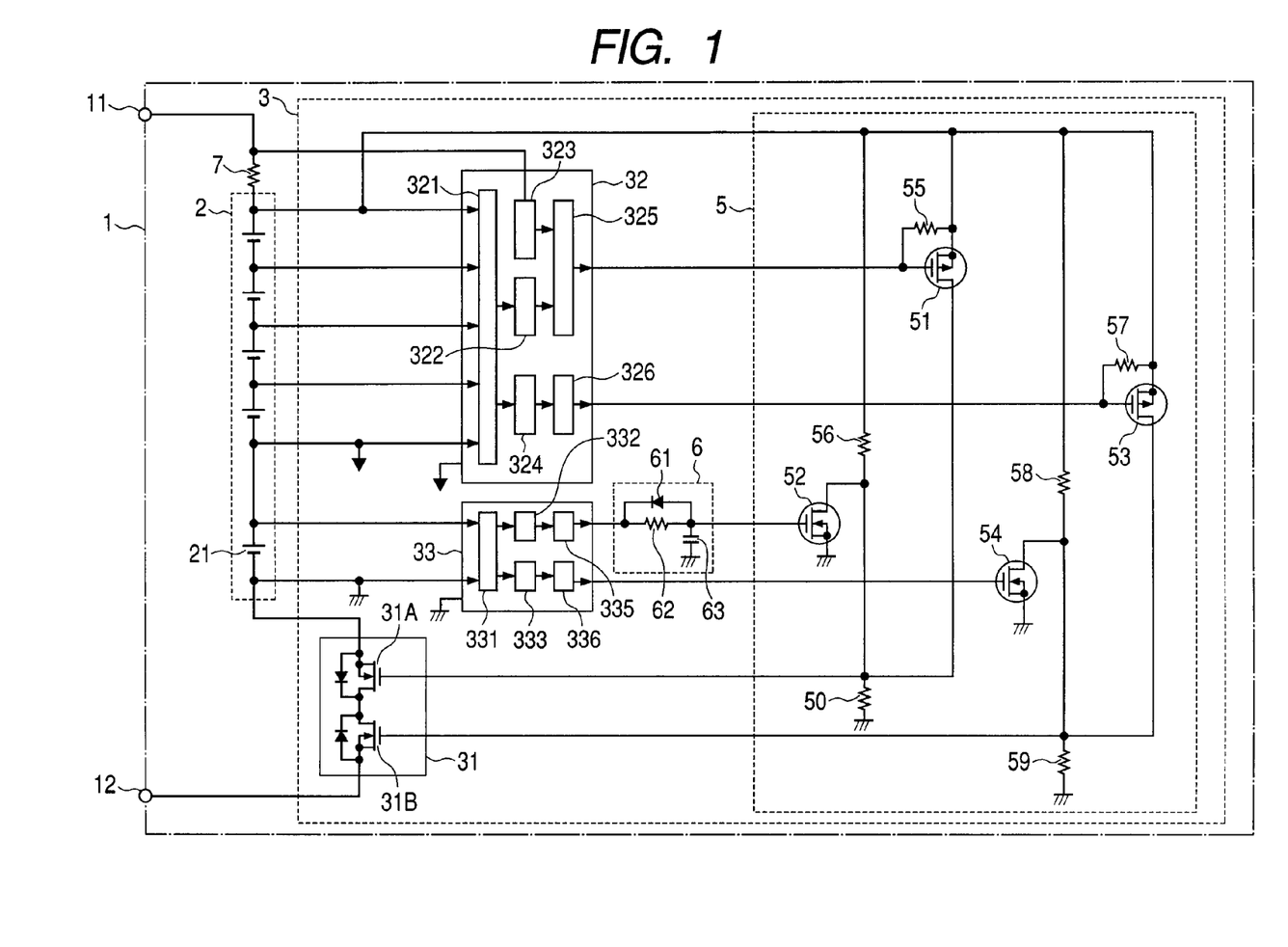
FIG. 1 is a block diagram of an embodiment of a battery pack according to the invention.

FIG. 1 is a block diagram of an embodiment of a lithium battery pack 1 according to the invention. The lithium battery pack 1 is composed of a battery set 2 including, for example, five lithium battery cells 21 (which are hereinafter referred to as battery cells simply) connected in series, a current detect resistor 7 connected in series to the battery set 2 for detecting a current flowing in the battery set 2, and a protection circuit 3. The voltage of the battery pack 1 is taken out of a positive pole terminal 11 and a negative pole terminal 12.

The protection circuit 3 is composed of a first protection circuit 32, a second protection circuit 33, a switch circuit 31 connected in series to the battery set 2, and a voltage level converter circuit 5 for transmitting output signals from the first and second protection circuits 32, 33 to the switch circuit 31.

The switch circuit 31 is composed of N-channel switching elements 31A, 31B respectively connected between the battery set 2 and negative pole terminal 12; and, when a high level signal (which is hereinafter referred to as an H signal) is applied to both of the switching elements 31A, 31B, the switch circuit 31 is allowed to conduct.

The second protection circuit 33 is composed of a battery voltage detect part 331, an over-discharge judgment part 332, an overcharge judgment part 333, an over-discharge signal output part 335, and an overcharge signal output part 336.

The voltage across the battery cell 21 (which is designated as 21E) disposed on the lower-most stage of the battery set 2 is detected by the battery voltage detect part 331. The thus detected voltage is compared with a first given voltage V1 set in the over-discharge judgment part 332 of the second protection circuit 33 and, when the detected voltage goes below the first given voltage V1, there is issued an H signal from the over-discharge signal output part 335. Also, the voltage detected by the battery voltage detect part 331 is compared with a second given voltage V2 set in the overcharge judgment part 333 and, when the detected voltage goes beyond the second given voltage V2, there is issued an H signal from the overcharge, signal output part 336.

On the other hand, the first protection circuit 32 comprises a battery voltage detect part 321, an over-discharge judgment part 322, an overcurrent judgment part 323, a signal output part 325, an overcharge judgment part 324, and an overcharge signal output part 326.

The battery voltage detect part 321 detects the terminal voltages of the battery cells 21 (which are hereinafter designated as 21A, 21B, 21C, and 21D respectively) disposed respectively on the first stage to fourth stage of the battery set 2. The respective detected voltages are compared with a first given voltage V1' set in the over-discharge judgment part 322 of the first protection circuit 32, when the detected voltages are lower than the first given voltage V1', there is issued an H signal from the signal output part 325. On the other hand, the overcurrent judgment part 323 detects a current flowing in the battery set 2 from the terminal voltage of the current detect resistor 7 and, when the detected current is larger than a given value, there is also issued an H signal from the signal output part 325.

The respective voltages of the battery cells 21A, 21B, 21C and 21D of the first stage to the fourth stage detected by the battery voltage detect part 321 are compared with a second given voltage V2' set in the overcharge judgment part 324 and, when the detected voltages go beyond the second given voltage V2', there is issued an H signal from the overcharge signal output part 326.

Figure 4:
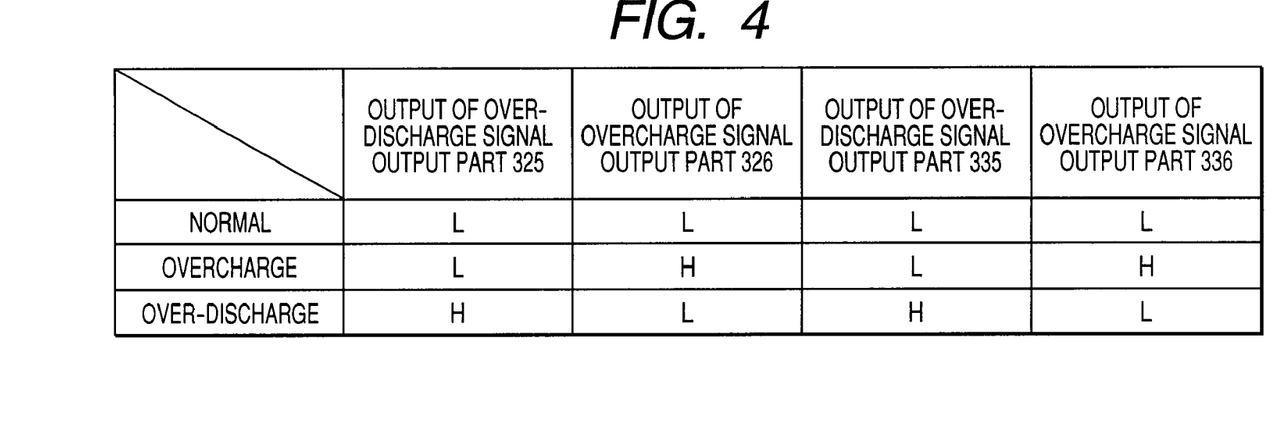
FIG. 4 is an explanatory view of the operation of the battery pack according to the invention.

Since the protection circuits 32 and 33 themselves are well known and are disclosed in, for example, the product manual of MM1414, the detailed description of the respective parts thereof is omitted here. However, the logic of the signal of the output part with respect to the detected voltage of the battery cell can be shown as in Table shown in FIG. 4. That is, when the voltage of the battery cell 21 is normal, there are issued low level signals (which are hereinafter referred to as L signals) from all of the output parts 325, 326, 335 and 336. For the overcharge, there are issued L signals from the output parts 325 and 335 and there are issued H signals from the output parts 326 and 336, respectively. Oppositely, for the over-discharge, there are issued L signals from the output parts 326 and 336, and there are issued H signals from the output parts 325 and 335, respectively.

The voltage level converter circuit 5 is used to not only convert output signals, which are respectively issued from the first and second protection circuits 32 and 33 and are different from each other in the potential thereof according to the respective circuit specifications of the first and second protection circuits 32 and 33, to signals having the same potential, but also apply such signals to the switch circuits 31; and, the voltage level converter circuit 5 comprises P-channel switching elements 51, 53 and N-channel switching elements 52, 54.

The positive pole terminal of the battery set 2 is connected through the source/drain of the switching element 51 to the gate of the switching element 31A of the switch circuit 31 as well as is connected through the source/drain of the switching element 53 to the gate of the switching element 31B. To the respective gates of the switching elements 51 and 53, there are applied the signals of the signal output parts 325 and 326, respectively. Also, between the drain of the switching element 51 and ground, there is connected a resistor 50; and, between the drain of the switching element 53 and the ground, there is connected a resistor 59.

On the other hand, the output signal of the over-discharge signal output part 335 is applied through dead time means 6 (which will be discussed later) to the gate of the switching element 52, while the output signal of the overcharge signal output part 336 is applied to the gate of the switching element 54. The source/drain of the switching element 52 is connected parallel to the resistor 50, while the source/drain of the switching element 54 is connected parallel to the resistor 59. Also, the positive pole terminals of the battery set 2 are respectively connected through resistors 56 and 58 to the drains of the switching elements 52 and 54.

When the voltage of the battery cell 21 is between the first and second given voltages, that is, when the battery cell voltage is normal, there are issued L signals from the signal output parts 325, 326, 335 and 336, whereby the switching elements 51 and 53 are turned on and the switching elements 52 and 54 are turned off, respectively. When the switching element 51 turns on, the potential of the positive pole of the battery set 2 is applied to the gate of the switching element 31A, so that the N-channel switching element 31A is turned on. Also, when the switching element 53 turns on, similarly, the N-channel switching element 31B is turned on.

Therefore, when the cell voltages of all the battery cells 21 are normal, the switching elements 31A and 31B are turned on to thereby allow the switch circuit 31 to conduct, so that the voltage of the battery set 2 is taken out from the terminals 11 and 12 to the outside. By the way, in the discharge time, that is, when the power tool is in use, there is formed a discharge path through a diode which is connected parallel to the switching element 31B and, therefore, the switching element 31B may be off. Also, in the charge time, since there is formed a charge path through a diode which is connected parallel to the switching element 31A, the switching element 31A may be off.

When the first and second protection circuits 32 and 33 detect the overcharge, the outputs of the overcharge signal output parts 326 and 336 become H signals. When the output of the overcharge signal output part 326 becomes an H signal, the switching element 53 is turned off, while the output of the overcharge signal output part 336 becomes an H signal, the switching element 54 is turned on. Therefore, since there is caused a short across the resistor 59 by an on resistance between the source and drain of the switching element 54, an L signal is input to the switching element 31B, whereby the switching element 31B is turned off. Accordingly, the switch circuit 31 is turned off to cut off the current path of the battery set 2.

Also, when the first and second protection circuits 32 and 33 detect the over-discharge or overcurrent, the outputs of the over-discharge/overcurrent signal output parts 325 and 335 become H signals. When the output of the over-discharge/ overcurrent signal output part 325 becomes an H signal, the switching element 51 is turned off, while the output of the over-discharge signal output part 335 becomes an H signal, the switching element 52 is turned on. Therefore, since there is caused a short across the resistor 50 by an on resistance between the source and drain of the switching element 52, an L signal is input to the switching element 31A, whereby the switching element 31A is turned off. Accordingly, the switch circuit 31 is turned off to thereby cut off the current path of the battery set 2.

Figure 5:
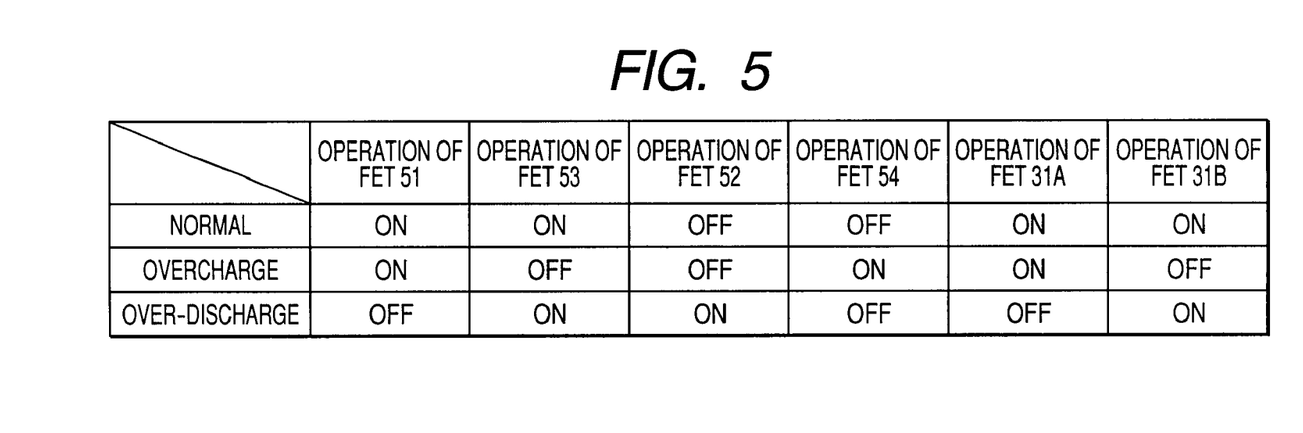
FIG. 5 is an explanatory view of the operation of the battery pack according to the invention.

When the operations of the above-mentioned respective switching elements 51~54 and 31A, 31B are put in order, they can be displayed as shown in FIG. 5.

In this manner, when the first and second protection circuits 32 and 33 detect the over-discharge, overcharge or overcurrent, the switch circuit 31 is turned off to thereby be able to protect the lithium battery cell 21. The present invention is characterized in that, in such circuit, a time constant circuit functioning as the dead time means 6 is connected between the over-discharge signal output part 335 of the second protection circuit 33 and the switching element 52. The dead time means 6 acts in such a manner that, when the variation of the signal of the over-discharge signal output part 335 is a short time in the range of a given time, the dead time means 6 prevents the signal variation from being transmitted to the switching element 52 disposed on the following stage. In other words, the dead time means 6 produces an output which does not respond to a variation in an input signal within the range of the given time. In the present embodiment, the dead time means 6 is composed of a resistor 62, a capacitor 63 and a diode 61.

Since, when the output of the over-discharge signal output part 335 is an L signal, the diode 61 is allowed to conduct, the output signal of the over-discharge signal output part 335 is immediately applied to the gate of the N-channel switching element 52. A dead time at the then time becomes 0 or a very short time. On the other hand, when the output of the over-discharge signal output part 335 is an H signal, the diode 61 is put into a non-conducting state, whereby the output of the over-discharge signal output part 335 provides a dead time composed of a time which is determined by the time constants of the resistor 62 and capacitor 63. By the way, the dead time means 6 is not limited to the structure composed of a resistor, a capacitor and a diode, but it can also be composed of, for example, a microcomputer or a timer circuit.

Figure 2:
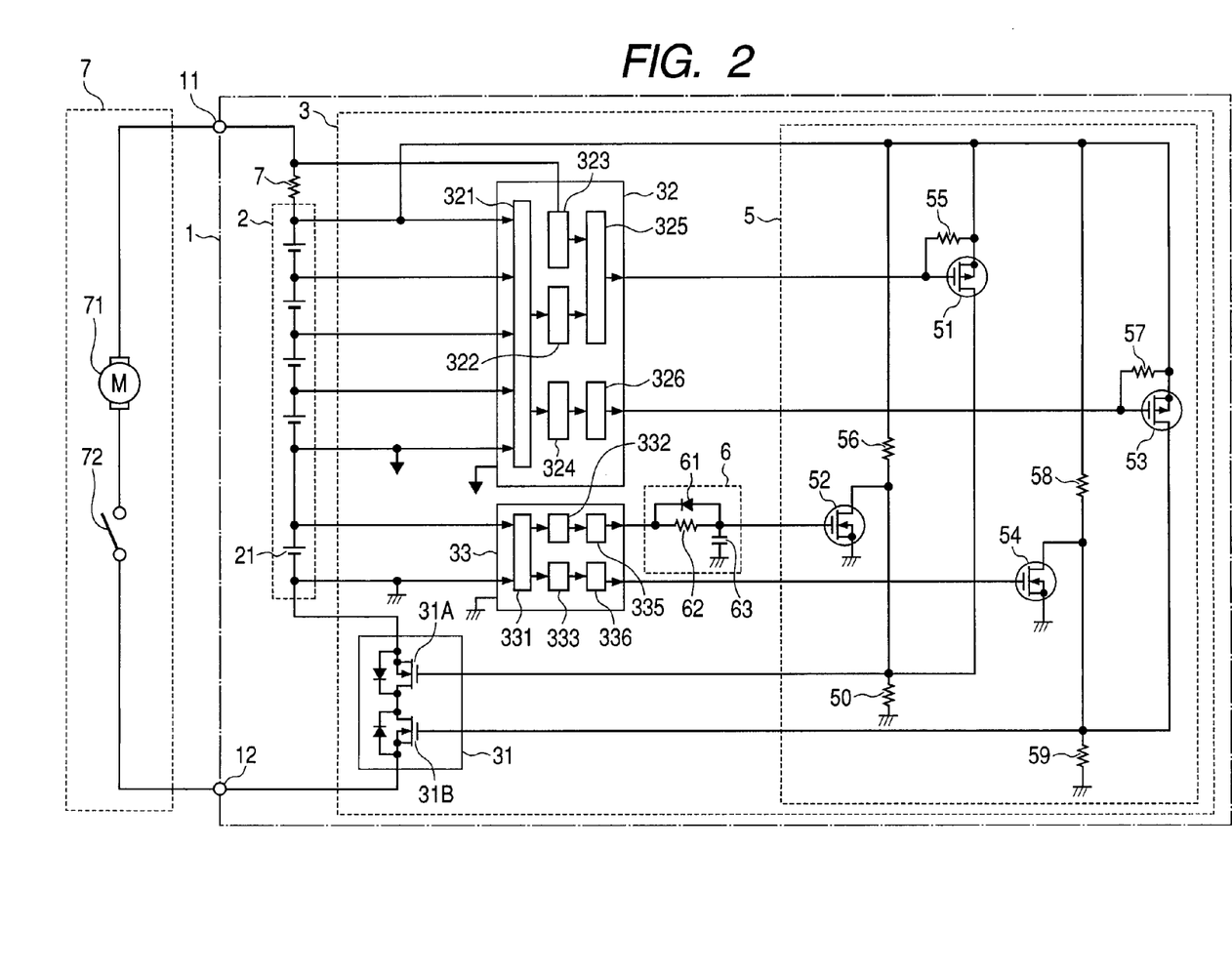
FIG. 2 is a block diagram of a power tool incorporating therein a battery pack according to the invention.

Now, FIG. 2 is a block diagram of an example of a cordless power tool 7 to which is connected the battery pack 1 according to the invention, while the cordless power tool 7 is composed of a DC motor 71 and a switch 72. As regards the battery set 2 connected to the cordless power tool 7, the power supply thereof is turned on and off by the switch 72 which is used to turn on and off the operation of the cordless power tool 7.

Figure 3:
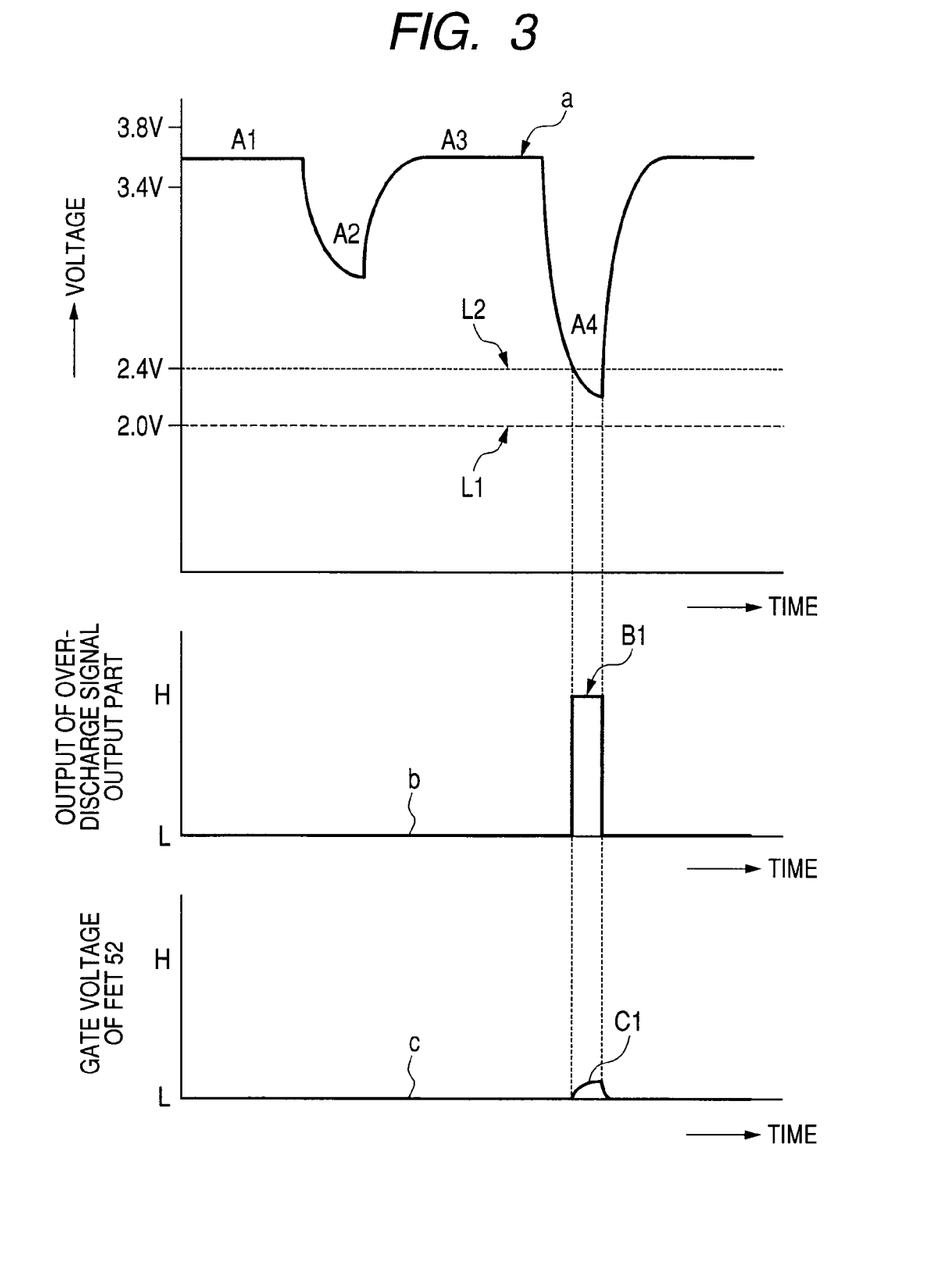
FIG. 3 is a waveform view for explanation of the operation of the battery pack according to the invention.

Next, description will be given below of the operation of the power tool 7, to which is connected the battery pack 1 according to the invention, with reference to FIG. 3. In FIG. 3, reference character a designates a variation in the battery voltage of the battery cell 21, L1 stands for an over-discharge judgment voltage value for judging the first protection circuit 32 as over-discharge, and L2 represents an over-discharge judgment voltage value for judging the second protection circuit 33 as over-discharge. Also, b designates the output of the over-discharge signal output part 335 of the second protection circuit 33, and c stands for a voltage to be applied to the gate of the switching element 52. In the present embodiment, L1 is 2.0 V and L2 is 2.4 V.

An A1 portion contained in the waveform a which shows the detect voltage of the battery cell 21 shows a voltage in a state where the switch 72 of the tool 7 is off and, specifically, the A1 portion shows that it is a voltage in the vicinity of 3.6 V which is the rated voltage of the lithium battery cell 21. Next, when the switch 72 of the tool 7 is turned on, the detect voltage lowers according to the load of the motor 71, thereby providing the waveform of an A2 portion. After then, when the switch 72 is turned off, the detect voltage rises and recovers up to the vicinity of 3.6 V, thereby providing a waveform shown by an A3 portion. Further, when a large load is applied and the switch 72 is turned on, the detect voltage lowers further to thereby cause a state in which the detect voltage goes below the over-discharge voltage judgment value L2 of the second protection circuit 33. During this period, the output b of the over-discharge signal output part 335 of the second protection circuit 33, as shown by B1 in FIG. 3, turns from an L output to an H output. However, according to the invention, since the output of the over-discharge signal output part 335 is applied through the dead time means 6 to the gate of the switching element 52, the applied voltage of the switching element 52 varies as shown by c. That is, the applied voltage varies an in a C1 portion according to a time constant which has been previously set by the dead time means 6. Thanks to this, the switching element 52 is allowed to maintain an off state, while the switch circuit 31 is allowed to maintain an on state.

In other words, provided that the above-mentioned period is within the range of the time constant previously set by the dead time means 6, when the tool is operated with a large load or the like and, as a result, even when the detect voltage of the battery cell is lower than the over-discharge judgment voltage value of the protection circuit for a given time, the current path of the battery set 2 is not cut off. This makes it possible to use the battery pack continuously.

Although description has been described heretofore of the embodiment of the invention, other various changes and modifications are also possible without departing from the scope of the basic concept of the invention and thus these changes and modifications also fall within the scope of the invention. For example, the voltage level converter circuit 5 and switch circuit 31 can also be realized easily by other electronic circuits.

What is claimed is:

1. A lithium battery pack, comprising:
   at least five lithium battery cells connected in series;
   a first protection circuit, which is connected to at least four lithium battery cells out of the five lithium battery cells to monitor each voltage of the four lithium battery cells respectively, outputting a first signal when the voltage of at least one of the four lithium battery cells is less than a first over-discharge voltage;
   a second protection circuit, which is connected to at least one lithium battery cell, which is different from the four lithium battery cells, to monitor the voltage of the lithium battery cell, which is different from the four lithium battery cells, outputting a second signal when the voltage of the lithium battery cell, which is different from the four lithium battery cells, is less than a second over-discharge voltage;
   a switch connected to a current path of the plurality of lithium battery cells, the switch turning off and the current path being cut off when the first signal or the second signal is outputted; and
   a dead time means, which is connected to the second protection circuit,
   wherein said first protection circuit further monitors the current flowing through the current path and outputs a third signal when the current goes over a predetermined current;
   wherein the switch turns off and the current path is cut off when the third signal is outputted; and
   wherein the second over-discharge voltage is greater than the first over-discharge voltage.

2. The lithium battery pack according to claim 1, the first protection circuit comprising a signal output part outputting the first signal and the third signal.

3. The lithium battery pack according to claim 1, further comprising a first switching element and a second switching element for controlling the switch,
   wherein the first switching element is connected to the first protection circuit and receives the first signal and the third signal; and
   wherein the second switching element is connected to the second protection circuit and receives the second signal.

4. The lithium battery pack according to claim 1, further comprising a second switch, wherein the first protection circuit monitors each voltage of the four lithium battery cells and outputs a fourth signal to cut off the second switch when at least one of the four lithium battery cells is over charged.

5. The lithium battery pack according to claim 4, wherein the second protection circuit monitors the voltage of the one lithium battery cell, which is different from the four lithium battery cells, and outputs a fifth signal to cut off the second switch when the one lithium battery cell, which is different from the four lithium battery cells, is over charged.

6. The lithium battery pack according to claim 1, wherein the four lithium battery cells connected to the first protection circuit are disposed next to each other respectively.

7. The lithium battery pack according to claim 6, wherein the lithium battery pack has a rated voltage of 18V.

8. The lithium battery pack according to claim 7, the first protection circuit comprising a signal output part outputting the first signal and the third signal.

9. The lithium battery pack according to claim 7, further comprising a first switching element and a second switching element for controlling the switch,
wherein the first switching element is connected to the first protection circuit and receives the first signal and the third signal; and
wherein the second switching element is connected to the second protection circuit and receives the second signal.

10. The lithium battery pack according to claim 9, wherein the four lithium battery cells connected to the first protection circuit are disposed next to each other respectively.

11. The lithium battery pack according to claim 10, wherein the lithium battery pack has a rated voltage of 18V.

12. A power tool comprising:
a motor;
at least five lithium battery cells connected in series;
a first protection circuit, which is connected to at least four lithium battery cells out of the five lithium battery cells to monitor each voltage of the four lithium battery cells respectively, outputting a first signal when the voltage of at least one of the four lithium battery cells is less than a first over-discharge voltage;
a second protection circuit, which is connected to at least one lithium battery cell, which is different from the four lithium battery cells, to monitor the voltage of the lithium battery cell, which is different from the four lithium battery cells, outputting a second signal when the voltage of the lithium battery cell, which is different from the four lithium battery cells, is less than a second over-discharge voltage;
a switch connected to a current path of the plurality of lithium battery cells, the switch turning off and the current path being cut off when the first signal or the second signal is outputted; and
a dead time means, which is connected to the second protection circuit,
wherein said first protection circuit further monitors the current flowing through the current path and outputs a third signal when the current is greater than a predetermined current;
wherein the switch turns off and the current path is cut off when the third signal is outputted; and
wherein the second over-discharge voltage is greater than the first over-discharge voltage.

13. A lithium battery pack, comprising:
a plurality of lithium battery cells connected in series;
a first protection circuit, which is connected to at least one lithium battery cell to monitor voltage of the at least one lithium battery cell respectively, outputting a first signal when the voltage of at least one of the lithium battery cells is less than a first over-discharge voltage;
a second protection circuit, which is connected to at least one lithium battery cell, which is different from the lithium battery cells connected to the first protection circuit, to monitor voltage of the at least one lithium battery cell, which is different from the lithium battery cells connected to the first protection circuit, outputting a second signal when at least one of the voltages of the lithium battery cell, which is different from the lithium battery cells connected to the first protection circuit, is less than a second over-discharge voltage which is smaller than the first over-discharge voltage;
a switch connected to a current path of the plurality of lithium battery cells, the switch turning off and the current path being cut off when the first signal or the second signal is outputted; and
a dead time means, which is connected to the first protection circuit in order to delay the timing that the first signal reaches the switch, when the voltage of the at least one lithium battery cell connected to the first protection circuit is lower than the first over-discharge voltage.

14. The lithium battery pack according to claim 13, wherein one of the first protection circuit and the second protection circuit further monitors the current flowing through the current path and outputs a third signal when the current goes over a predetermined current.

15. The lithium battery pack according to claim 14, further comprising a first switching element and a second switching element for controlling the switch,
wherein the first switching element is connected to one of the first protection circuit and the second protection circuit and able to receive the first signal and the third signal; and
wherein the second switching element is connected to another one of the first protection circuit and the second protection circuit and able to receive the second signal.

16. The lithium battery pack according to claim 13, wherein the plurality of lithium battery cells have five battery cells connected in series,
one of the first protection circuit and second protection circuit is connected to four lithium battery cells, and
another one of the first protection circuit and second protection is connected to one lithium battery cell which is different from the four lithium battery cells.

17. The lithium battery pack according to claim 13, further comprising a second switch, wherein at least one of the first protection circuit and the second protection circuit monitors voltage of at least one of the plurality of lithium battery cells and outputs a fourth signal to cut off the second switch when at least one of the plurality lithium battery cells is over charged.

18. The lithium battery pack according to claim 13, wherein the dead time means comprises a capacitor.

19. The power tool according to the claim 18,
wherein one of the first protection circuit and the second protection circuit further monitors the current flowing through the current path and outputs a third signal when the current goes over a predetermined current.

20. The power tool according to the claim 18,
wherein the plurality of lithium battery cells have five battery cells connected in series,
one of the first protection circuit and the second protection circuit is connected to four lithium battery cells, and
another one of the first protection circuit and the second protection circuit is connected to one lithium battery cell which is different from the four lithium battery cells.

21. The power tool according to the claim 18, the power tool further comprising a second switch, wherein at least one of the first protection circuit and the second protection circuit monitors voltage of at least one of the plurality of lithium battery cells and outputs a fourth signal to cut off the second switch when at least one of the plurality lithium battery cells is over charged.

22. A power tool comprising:
- a motor;
- a plurality of lithium battery cells connected in series;
- a first protection circuit, which is connected to at least one lithium battery cell to monitor the voltage of the at least one lithium battery cell respectively, outputting a first signal when the voltage of at least one of the lithium battery cells is less than a first over-discharge voltage;
- a second protection circuit, which is connected to at least one lithium battery cell, which is different from the lithium battery cells connected to the first protection circuit, to monitor voltage of the lithium battery cell, which is different from the lithium battery cells connected to the first protection circuit, outputting a second signal when at least one of the voltage of the lithium battery cell, which is different from the lithium battery cells connected to the first protection circuit, is less than a second over-discharge voltage which is smaller than the first over-discharge voltage;
- a switch connected to a current path of the plurality of lithium battery cells, the switch turning off and the current path being cut off when the first signal or the second signal is outputted; and
- a dead time means, which is connected to the first protection circuit in order to delay the timing that the first signal reaches the switch, after the voltage of the at least one lithium battery cell connected to the first protection circuit is lower than the first over-discharge voltage.

23. The power tool according to the claim 22, further comprising a first switching element and a second switching element for controlling the switch,
- wherein the first switching element is connected to one of the first protection circuit and the second protection circuit and able to receive the first signal and the third signal; and
- wherein the second switching element is connected to another one of the first protection circuit and the second protection circuit and able to receive the second signal.

24. The lithium battery pack according to claim 22, wherein the dead time means comprises a capacitor.

* * * * *